Nov. 28, 1950     H. L. BARNEY ET AL     2,531,600
ELECTRON BEAM TUBE FILTER
Filed Feb. 4, 1949                        7 Sheets-Sheet 1
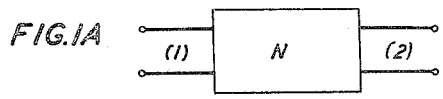
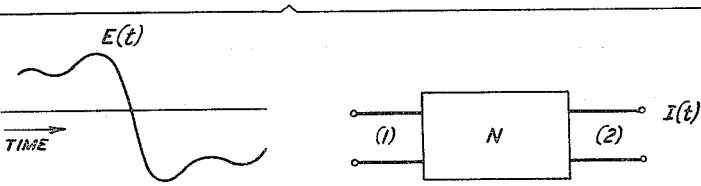
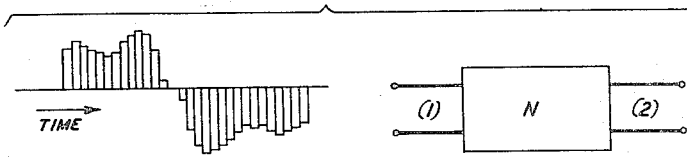
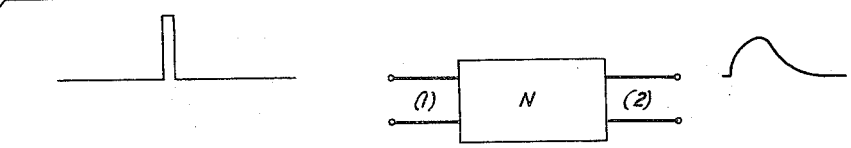
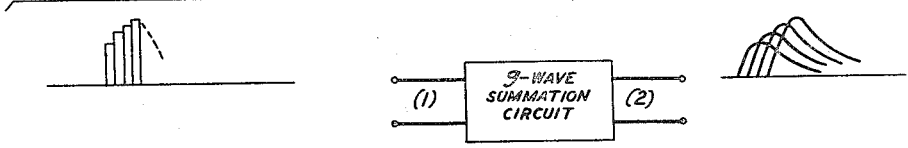
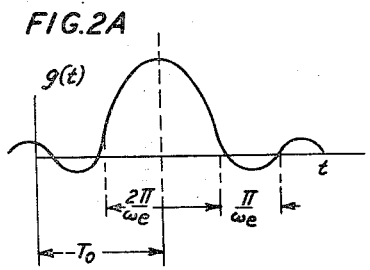
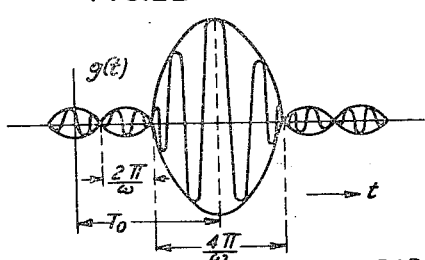
INVENTORS  H.L. BARNEY
           L.C. PETERSON
           R.K. POTTER
           R.W. SEARS
BY
N. D. Ewing
ATTORNEY

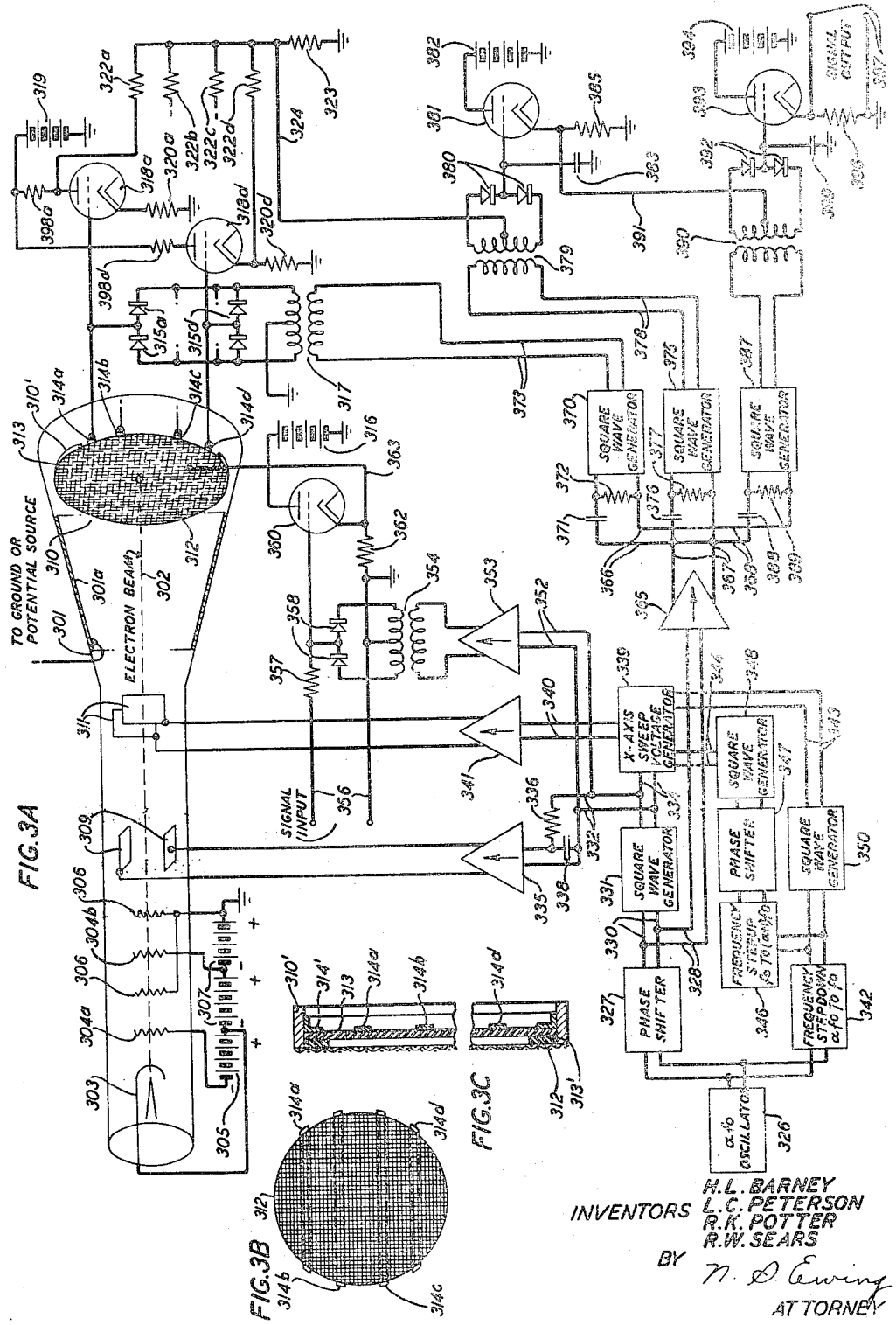

FIG.4A
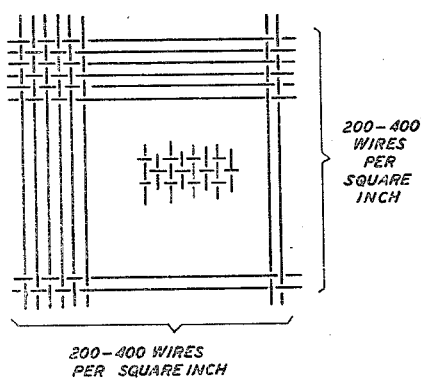
200-400 WIRES PER SQUARE INCH
200-400 WIRES PER SQUARE INCH
FIG.4B
FIG.4C
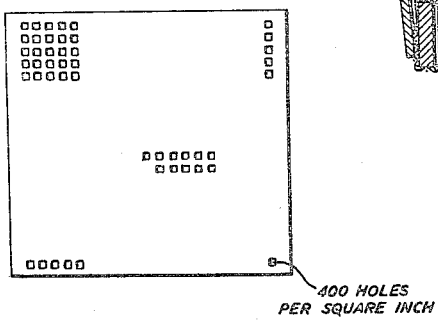
400 HOLES PER SQUARE INCH
FIG.4E
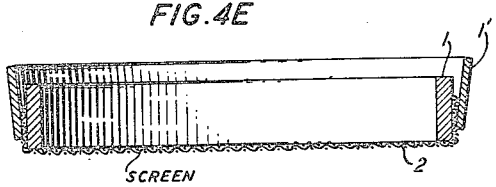
SCREEN
FIG.4F
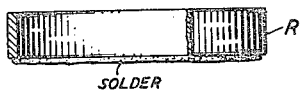
SOLDER
FIG.4D
FIG.4G
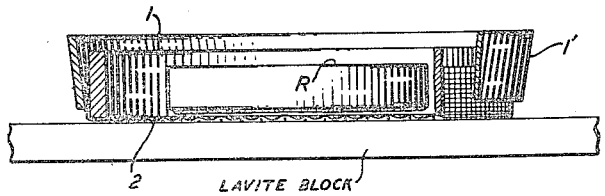
LAVITE BLOCK
INVENTORS  H.L. BARNEY
L.C. PETERSON
R.K. POTTER
R.W. SEARS Nov. 28, 1950   H. L. BARNEY ET AL   2,531,600
ELECTRON BEAM TUBE FILTER
Filed Feb. 4, 1949   7 Sheets-Sheet 5

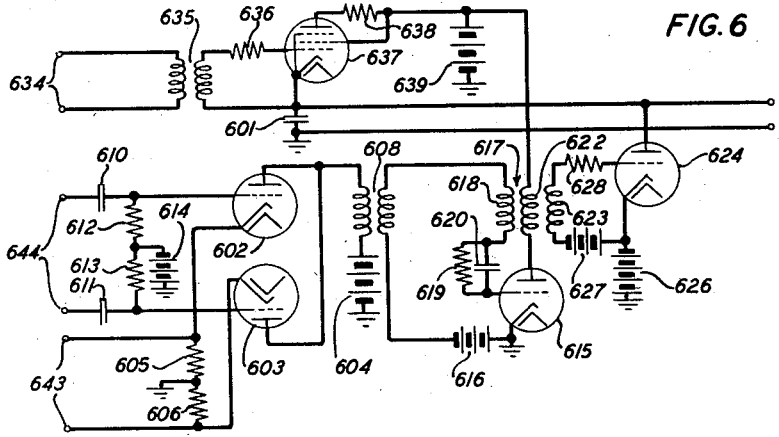

FIG. 6

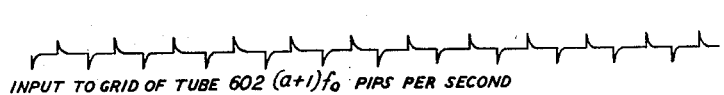

FIG. 7A

INPUT TO GRID OF TUBE 602 $(a+1)f_0$ PIPS PER SECOND

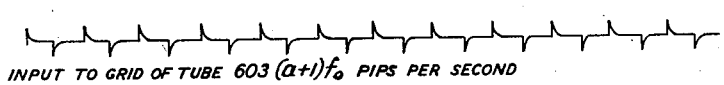

FIG. 7B

INPUT TO GRID OF TUBE 603 $(a+1)f_0$ PIPS PER SECOND

FIG. 7C

INPUT TO CATHODES OF TUBES 602 & 603 $f_0$ SQUARE WAVE

FIG. 7D

OUTPUT OF TUBES 602 & 603 TO GRID OF BLOCKING OSCILLATOR TUBE 615

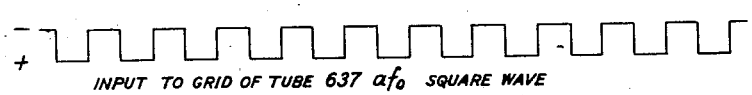

FIG. 7E

INPUT TO GRID OF TUBE 637 $af_0$ SQUARE WAVE

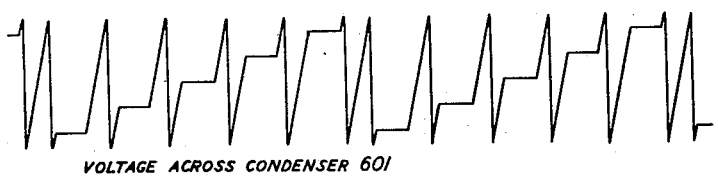

FIG. 7F

VOLTAGE ACROSS CONDENSER 601

INVENTORS
H. L. BARNEY
L. C. PETERSON
R. K. POTTER
R. W. SEARS
BY
N. D. Ewing
ATTORNEY Nov. 28, 1950     H. L. BARNEY ET AL     2,531,600
ELECTRON BEAM TUBE FILTER
Filed Feb. 4, 1949     7 Sheets-Sheet 6

VOLTAGE ACROSS RESISTANCE 812 RESULTING FROM $2(a+1)f_0$ SQUARE WAVE INPUT

INPUT TO TRANSFORMERS 835 & 808 $af_0$ SQUARE WAVE

VOLTAGE APPLIED TO GRID OF TUBE 815 (DOTTED LINE INDICATES JUST OPERATE POINT FOR BLOCKING OSCILLATOR TUBE 815

VOLTAGE ACROSS CONDENSER 801

INVENTORS    H. L. BARNEY
L. C. PETERSON
R. K. POTTER
R. W. SEARS

BY *N. A. Ewing*

ATTORNEY

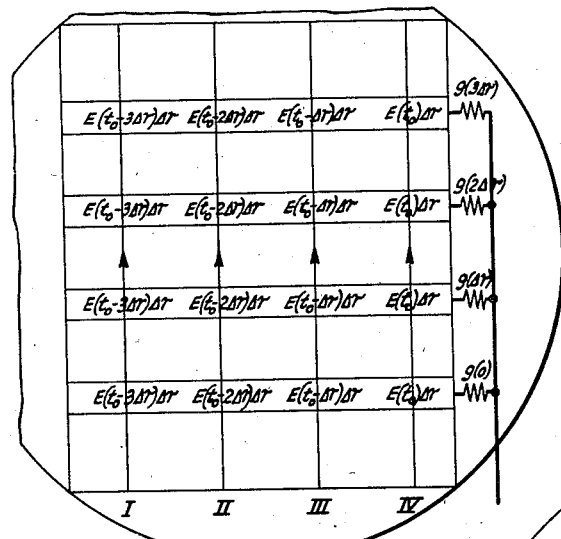
FIG.IIA
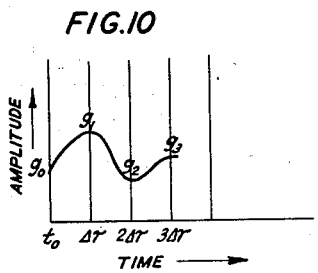
FIG.IO
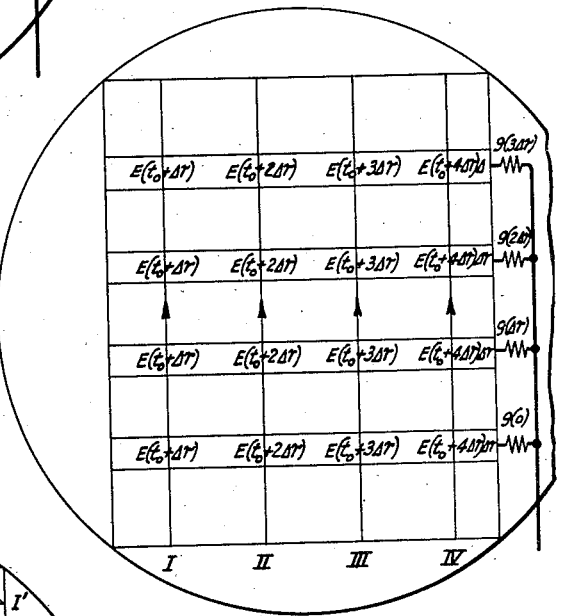
FIG.IIB
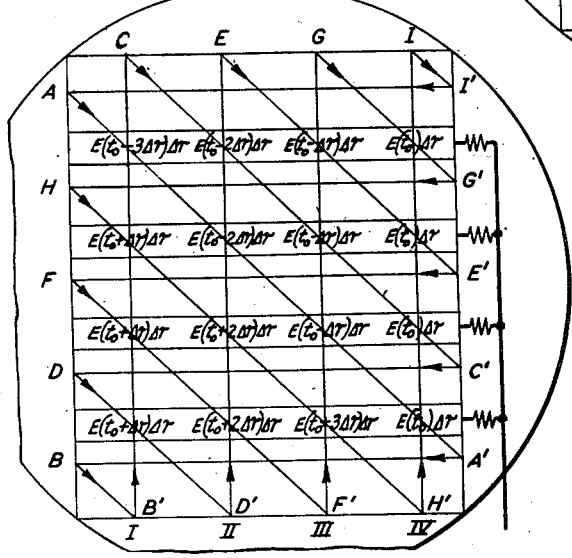
FIG.IIC
INVENTORS
H. L. BARNEY
L. C. PETERSON
R. K. POTTER
R. W. SEARS
BY
ATTORNEY Patented Nov. 28, 1950

2,531,600

UNITED STATES PATENT OFFICE 2,531,600

ELECTRON BEAM TUBE FILTER

Harold L. Barney, Madison, Liss C. Peterson, Chatham, Ralph K. Potter, Madison, and Raymond W. Sears, West Orange, N. J., assignors to Bell Telephone Laboratories, Incorporated, New York, N. Y., a corporation of New York Application February 4, 1949, Serial No. 74,616

14 Claims. (Cl. 346—33)

This invention relates to the modification of time-varying functions in accordance with preselected patterns; more particularly, it relates to electrical transducers of the type which are known in the art as transversal filters.

The behavior of electrical networks can be specified in two ways representing two different physical points of view. Ordinarily, one thinks first of the well-known steady-state point of view which describes the network performance in terms of the concepts of amplitude and phase response versus frequency. In addition to this more conventional viewpoint there is the time function one in which the network is described in terms of its magnitude time response at the receiving end resulting from the amplitude of an impulse of infinitesimal duration at the sending end. Network response may thus be considered either in terms of frequency or time functions. The bridge between these two avenues of approach is the Fourier integral which may be thought of as a mathematical device for expressing a time function in terms of steady-state phenomena.

For the most part prior art practice has been to base the design of communication networks upon the steady-state frequency amplitude characteristics and an elaborate theory has been worked out for such design procedures. The networks thus obtained contain as elements resistances, inductances and capacitances, the frequency and/or phase selective effects of which are used in various combinations to secure desired response characteristics.

On the other hand when network design is considered from the time function point of view, that is when time rather than frequency is taken as the independent variable, one is led to a broad group of selective circuits whose principle of operation does not depend upon resonant combinations of network elements.

A certain class of devices which are known in the art as transversal filters, substitute the time function approach for the conventional steady-state approach in the simulation of network response, operating through a series of steps which include the following:

(1) Recording or storing the input signal;
(2) Collecting samples of the stored record;
(3) Weighting the collected samples in accordance with a predetermined multiplying function; and
(4) Integrating the weighted increments of record to produce a modified output.

It is the principal object of this invention to provide greater facility in modifying given functions of time in accordance with desired patterns of amplitude, frequency, and phase variation.

A more specific object of this invention is to provide in a transversal filter an improved system for collecting and weighting samples of the stored record.

The present invention relates broadly to a transversal filter in which the input signal is stored as a series of parallel records in space which vary from one to another in accordance with the values of a given input function during each of a succession of equal time intervals, and in which the samples to be weighted are derived during corresponding time intervals by neutralizing points on each of the stored records in rotation in such a manner that the neutralized points lie along a succession of parallel lines which intersect the records obliquely. The derived samples are weighted in rotation in accordance with selected values of a chosen weighting function, and successively integrated to form the desired output function.

In certain systems disclosed by L. C. Peterson and R. K. Potter in application Serial No. 731,232 filed February 27, 1947, the function of storing a record of the input signal, weighting samples of the stored record, and integrating the weighted samples in a preselected order is performed in a cathode-ray tube. The aforesaid tube has a recording beam intensity varied in accordance with the impressed signal which scans and deposits charge on a target comprising a plurality of elements which are either shaped or potential varied in accordance with a selected weighting function and a wiping beam moving in synchronism with the recording beam to collect the weighted charges from the target through secondary emission paths and integrate them in a common output circuit. In accordance with another modification disclosed by Peterson and Potter supra the weighted elements of charge are collected from the target elements by means of a rotating switch moving synchronously with the recording beam.

A preferred embodiment of the transverse filter of the present invention comprises a cathode-ray tube which utilizes a single beam for both recording and wiping operations, the beam being switched in succession from a vertical recording position to oblique wiping positions preceding and following the recording beam. The target over which the beam moves comprises a rectangular insulating sheet, such as mica, on the back of which is disposed a plurality of spaced metallic strips in transverse parallel relation. Attached to each of the metallic backing strips is a circuit including a weighting resistor value in accordance with a selected ordinate of the chosen weighting function, all of the weighting resistors being connected together through a series of gating circuits to a common output junction. The input signal is introduced into the system by means of a barrier grid interposed in front of the mica target sheet and having a few thousandths of an inch separation therefrom. The complex scanning motion of the beam, which executes a series of vertical recording lines in alternation with oblique scanning lines, is controlled by two pairs of electrostatic deflection plates to which is connected a multielement sweep circuit. In synchronism with the switching of the beam the potential of the barrier grid is shifted so that during the vertical recording position the potential of the grid is varied in accordance with the input signal, while during the wiping operation the potential of the grid is changed to a constant value to enable the charge recorded on the target to be neutralized. Currents proportional to the recorded charge are thus enabled to flow from the respective target backing strips during the wiping operation and through the weighting circuits to the common output circuit where they are integrated in successive groups to produce a modified output current.

Additional objects and features of the invention will be apparent after a study of the detailed description which follows hereinafter, and the attached drawings, of which:

Figs. 1A to 1E are diagrams illustrating the theory of operation of transversal filters;

Figs. 2A and 2B show graphical interpretations of two specific filter characteristics;

Fig. 3A is a preferred embodiment of a complete system in accordance with the present invention utilizing a cathode-ray tube having an electron beam focussed in the plane of the target electrode which executes a series of vertical recording scans preceded and/or followed by oblique wiping scans;

Fig. 3B is a plan view of the multielement target 310 of Fig. 3A;

Fig. 3C is a detailed cross-sectional view of the multielement target 310 and the barrier grid 312 of Fig. 3A;

Figs. 4C-4G are details of construction of alternate forms of the barrier grid 312 of Fig. 3A;

Figure 5A:
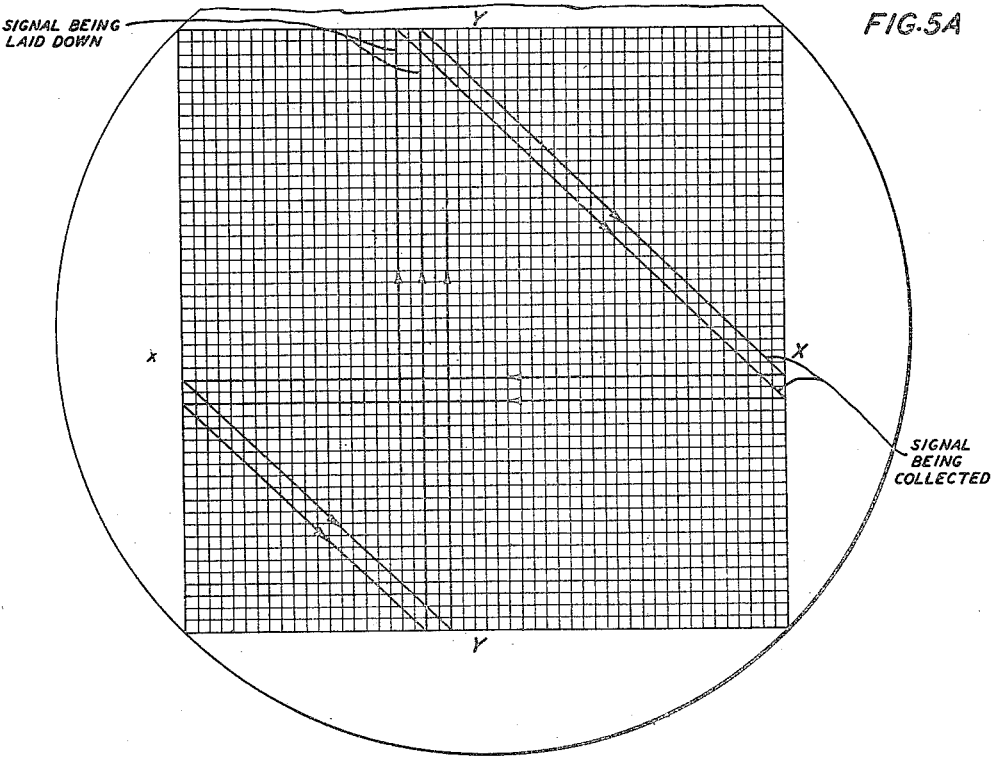
Fig. 5A shows diagrammatically the scanning motion executed by the beam of Fig. 3A.
Figure 5B:
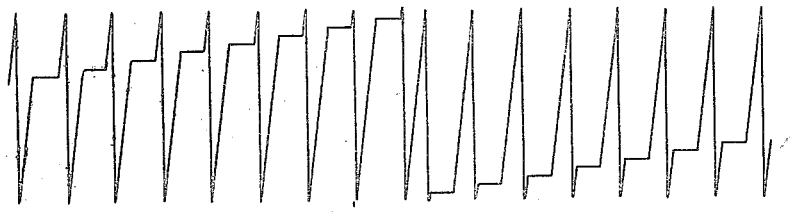
Figure 5C:
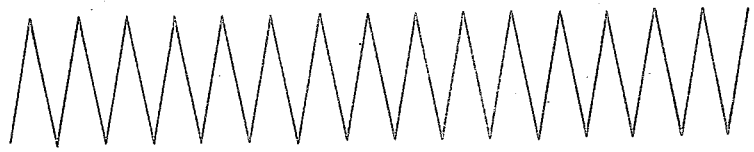
Figure 8:
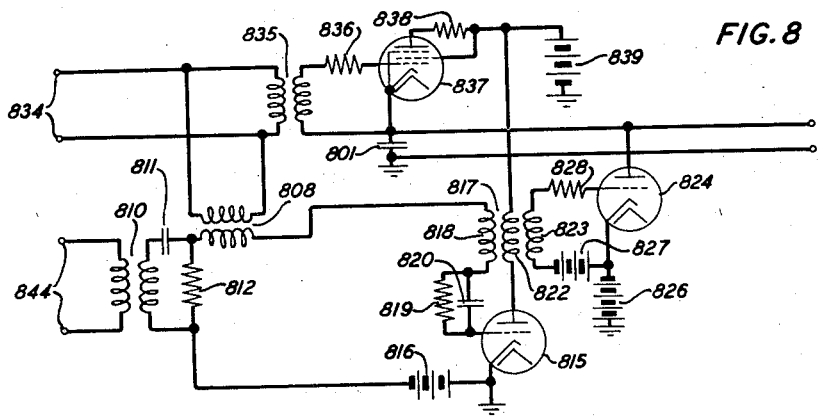

Figs. 5B and 5C respectively, represent the X and Y sweep voltages impressed on the deflection plates 311 and 309 of Fig. 3A;

Fig. 6 shows in schematic a preferred embodiment of the X-axis sweep circuit included in the system fo Fig. 3A;

Figs. 7A-F indicate voltage forms at various points in the circuit of Fig. 6;

Fig. 8 shows schematically an alternative form of the X-axis sweep circuit which could be substituted for the circuit shown in Fig. 6.

Figs. 9A-D indicate voltage forms at various points in the circuit of Fig. 8;

Fig. 10 is a graph illustrating the use of a typical weighting function in the system of Fig. 3A; and Figs. 11A-C illustrate graphically the manner in which the beam functions to deposit and collect charge on the target 310 in the system of Fig. 3A.

A concept which may be helpful in interpreting the specification and claims hereinafter is that of the transfer indicial admittance of a system. This quantity is defined by J. R. Carson in Electric Circuit Theory and the Operational Calculus, McGraw-Hill, 1926, page 14, as the ratio of the output current of the system, expressed as time function, to the magnitude of the steady electromotive force suddenly inserted at the input of the system at time $t=0$.

The time rate-of-change of the transfer indicial admittance defined above is a function of time designated $g(t)$. The function $g(t)$ is variously referred to in the specification and claims hereinafter as the "impulse response" or merely the "$g$-function" of a system.

Further discussion and definition of certain mathematical concepts, such as that of the "unit impulse," which will be relied on in the detailed description hereinafter will be found in Volume I of Transients in Linear Systems by Gardner and Barnes, John Wiley and Sons, 1942, pages 255–263.

The broad principles upon which the time-function point of view is based are illustrated in Figs. 1A to 1E, to which reference is now made. Consider a frequency selective network such as is illustrative schematically by N in Fig. 1A. Let us assume that the complex voltage wave $E(t)$ shown in Fig. 1B which is any continuous function of voltage versus time, is impressed upon the input 1 of the network. At the output 2 there will then appear a current wave which we designate as $I(t)$. Now let it be supposed that the voltage wave $E(t)$ is split up into a series of narrow pulses as shown in Fig. 1C. With this pulsed wave impressed upon the input terminals 1, one should expect to obtain at the output terminals 2 very nearly the same current wave $I(t)$ obtained before.

Now referring to Fig. 1D, assume that there is impressed upon the network a single pulse of the sort into which the voltage wave $E(t)$ has been subdivided. At the network output terminals 2 there now appears a function which as the pulse width approaches zero is proportional to the $g$-function of the network as defined above. It should be noted that any other pulse or different amplitude would result in the approximate $g$-function except that its amplitude would vary in proportion to the applied pulse amplitude and that moreover its time of occurrence would depend on the time of pulse application. Thus it follows as shown in Fig. 1E that in the limit the current wave $I(t)$ which appears at the output terminals 2 as a result of the application of the voltage wave $E(t)$ at the input terminals 1 is the sum of a number of overlapping $g$-functions whose relative strengths or amplitudes vary in accordance with the impressed voltage wave $E(t)$. Using somewhat more precise language one can say that if the network is subjected at the input 1 to an initial pulse at some arbitrary time, which for convenience may be called zero, and if this pulse is followed by others at specified values of time, the total response at the output terminals 2 at any later time will be the sum of the responses which have occurred up to that time.

Thus, two important principles applicable to this approach to network theory may be derived from the above. First, the network response to unit impulse of infinitesimal duration completely determines the response to any other input wave. Second, the response at any time depends upon the history of the applied input wave previous to the time in question so that the past history must be available at least over a time interval within which the $g$-function is of appreciable magnitude.

Therefore the network can be looked upon as a circuit for effecting the summation of a series of time displaced $g$-functions in which the individual amplitude of each of the respective $g$-functions is proportional to the corresponding time displaced instantaneous value of the impressed voltage wave $E(t)$. This process is schematically indicated in Fig. 1E.

Adopting a slightly different point of view one can also look upon the output wave as representing at any time a weighted history or record of the input wave where the $g$-function has acted as the weighting factor.

The foregoing statements may be summarized by deriving a mathematical expression for the network response to an arbitrary driving force from the assumption that the net behavior of a linear system at any instant is a function of the linear superposition of all the responses which have occurred up to that time counting from some arbitrary starting point. Assume, for example, that a network is subjected to an initial voltage pulse $E(t)$ at the time $t=0$ and that this pulse is followed by others at specified values of time. Then the total response at any later time will be the sum of the responses which have occurred up to that time, due allowance being made for the time at which each pulse was applied.

Let the time axis then be divided into short intervals $\Delta\tau$ of equal width, the electromotive force $E(t)$ being approximated by a series of rectangular pulses applied for the duration of each time interval $\Delta\tau$. The total response at a specified time $t$ is then approximately the sum at that instant of all the elementary responses started previous to that instant. If the interval $\Delta\tau$ is very small, that is, approaches zero as a limit, the response at time $t$ to the first impulse is $\Delta\tau E(0)g(t)$, where $g(t)$ is the response to unit impulse or $g$-function as defined hereinbefore, where $E(0)$ is the amplitude of the voltage wave $E(t)$ at time $t=0$. Consider now the $(n+1)^{th}$ impulse. The response at time $t$ is $E(n\Delta\tau)\Delta\tau g(t-n\Delta\tau)$. In this expression it should be noted that $n\Delta\tau$ is the time of impulse application. The reason that the argument of the $g$-function in this latter expression is $t-n\Delta\tau$ and not $t$ is that this pulse does not come into existence until the time $n\Delta\tau$ and the expression is only valid for the time equal to or greater than $n\Delta\tau$. Assume an arbitrary point on the time scale to be denoted by $\tau$, thus $\tau=n\Delta\tau$. The current response $I(t)$ at the instant $t$ is the sum at time $t$ of all elementary responses that have occurred between time equal to 0 when the first impulse was started and time $t$ as the length of the time interval $\Delta\tau$ approaches zero. Hence $$I(t) = \lim_{\Delta\tau \to 0} \sum_{\tau=0}^{\tau=t} E(t)\Delta\tau g(t-\tau) \quad (1)$$

By definition of an integral this may also be written $$I(t) = \int_0^t E(\tau)g(t-\tau)d\tau \quad (2)$$

or $$I(t) = \int_0^t E(t-\tau)g(\tau)d\tau \quad (2')$$

This equation thus expresses the system response to an arbitrary driving force in terms of the response to a unit impulse, that is, an applied pulse which in the limit approaches unit area and infinitesimal duration. Thus it follows that a knowledge of the response $g(t)$ to a unit impulse is sufficient to specify completely the system performance. This implies in particular that the steady-state performance of a particular network may also be determined from a knowledge of $g(t)$ for that network. Suppose, for example, that the network is a filter passing a certain band of frequencies. This is then merely a reflection of the fact that $g(t)$ behaves in a very definite manner. To illustrate this in a general way, assume that a sinusoidal voltage $E(t) = E \sin \omega t$, where $E$ represents the steady-state amplitude and $\omega=$ the angular frequency, has been applied to the network at $t=0$; and that all transients have died out. The steady-state current can then be written as $$I(t) = E|Y_{12}(i\omega)| \sin [\omega t - \varphi(\omega)] = \\ Ea_{12}(\omega) \sin \omega t + Eb_{12}(\omega) \cos \omega t \quad (3)$$

where $Y_{12}(i\omega)$ is the transfer admittance between input and output terminals of the selected network and $\varphi(\omega)$ its phase angle. By writing $Y_{12}(i\omega) = a_{12}(\omega) + ib_{12}(\omega)$, in which $a_{12}$ and $b_{12}$ are constants, the second of expressions (3) is obtained. An equivalent expression may also be obtained from (2) or (2') by inserting $E(t) = E \sin \omega t$ and extending the range of integration to infinity (which means that transient distortion had died out) one obtains, $$I(t) = E \sin \omega t \int_0^\infty \cos \omega t g(\tau) d\tau - \\ E \cos \omega t \int_0^\infty \sin \omega t g(\tau) d\tau \quad (4)$$

By comparison of (3) and (4) it follows that $$\left. \begin{array}{l} a_{12}(\omega) = \int_0^\infty \cos \omega t g(\tau) d\tau \\ b_{12}(\omega) = -\int_0^\infty \sin \omega t g(\tau) d\tau \end{array} \right\} \quad (5)$$

The points to be emphasized in general are, first, that the expressions (5) establish quantitative relations between the frequency selection properties of the networks and the response to unit impulse excitation; and second, that both the real and imaginary components of the transfer admittance can be calculated from a knowledge of the response to unit impulse. This relationship may also be further illustrated as follows: Multiply the second of Equations 5 with $i$, the imaginary unit, and add to the first; then use Euler's formula. The result is $$Y_{12}(i\omega) = \int_0^\infty g(\tau) e^{-i\omega t} d\tau \quad (6)$$

from which it follows that the steady-state transfer admittance is the Fourier transform of the unit impulse response. From a principal point of view, it is thus irrelevant whether frequency selection properties of a network are stated in terms of steady-state frequency response to sinusoidal driving forces or whether they are given as the time response to a unit impulse. The frequency response is merely the spectral analysis of the time response to a unit impulse. It also follows from (6) that $$g(t) = \frac{1}{\pi} \int_0^\infty |Y_{12}(i\omega)| \cos (\omega t + \theta(\omega)) d\omega \quad (7)$$

where $Y_{12}(i\omega)$ denotes the amplitude and $\theta(\omega)$ the phase of the steady-state transfer admittance. Equation 7 in principle allows $g(t)$ to be calculated from a knowledge of the frequency spectrum of the steady-state transfer admittance, i. e. from the amplitude frequency and phase characteristics of the network. Moreover, we have from (5)

$$g(t) = \frac{2}{\pi} \int_0^\infty a_{12}(\omega) \cos \omega t \, d\omega$$

and $$g(t) = -\frac{2}{\pi} \int_0^\infty b_{12}(\omega) \sin \omega t \, d\omega$$

(8)

Hence it follows that the time response $g(t)$ to unit impulse is completely determined when either the real or the imaginary component of the steady-state transfer impedance is specified over the entire frequency range.

Stressing the physical interpretation of the facts presented rather than the mathematical analysis, three steps suggest themselves as a means of which an applied input function may be modified in accordance with certain admittance characteristics to produce a desired output response without resort to the conventional concepts of frequency selective networks. They are:

1. Recording or storage of the input wave;
2. Deriving samples of the stored record, weighting of the said samples by means of $g$-waves; and
3. Summing the weighted samples of the record.

These are fundamental steps which can serve as building blocks in frequency selective devices operating on a time function basis. It should be noted that in arriving at these steps no reference has been made to vibrating systems such as coil and condenser combinations nor has any use been made of the concepts of amplitude and phase versus frequency response. These concepts have now been replaced by the single concept of the $g$-wave. In other words the physical phenomena conventionally described by the amplitude and phase versus frequency functions are now described by the single function $g(t)$.

As concrete examples of $g$-functions, consider two cases of functions in which the positive and negative values are symmetrical with respect to a certain value of time, say time $T_0$, where $T_0 > 0$. Consider first a low-pass filter having a uniform transfer impedance equal to $K$ from frequency zero to a cut-off angular frequency $\omega_c$. Outside this range it is assumed that no transmission occurs. As a consequence of the stipulation of even time response, the phase shift $\theta(\omega)$ is linear and is given by the following equation:

$$\theta(\omega) = -\omega T_0 + n.2\pi \quad (9)$$

For the low-pass filter under consideration we thus obtain by substituting the above in Equation 7:

$$g(t) = \frac{1}{\pi} \int_0^{\omega_c} \cos (\omega t - \omega T_0) K \, d\omega \quad (10)$$

or $$g(t) = \frac{\omega_c K}{\pi} \frac{\sin [\omega_c(t - T_0)]}{\omega_c(t - T_0)} \quad (11)$$

This function is shown as Fig. 2A. It may be demonstrated that the width of the main oscillatory lobe is inversely proportional to the band width $f_c$. It is also seen that the received signal reaches its maximum at the time $t = T_0$ and that the maximum response is proportional to the area $\omega_c K$ under the amplitude characteristic.

As a second example we consider an idealized band pass filter of even time response and with a flat amplitude characteristic between the cut-off frequencies $\omega_{c1}$ and $\omega_{c2}$ ($\omega_{c2} > \omega_{c1}$). Outside this frequency range it is assumed that no transmission can take place. From (7) and (11)

$$g(t) = \frac{K}{\pi} \int_{\omega_{c1}}^{\omega_{c2}} \cos (\omega t - \omega T_0) d\omega \quad (12)$$

which may be reduced to $$g(t) = \frac{wK}{\pi} \frac{\sin w\left(\frac{t - T_0}{2}\right)}{\frac{w(t - T_0)}{2}} \cos \omega_m(t - T_0) \quad (13)$$

Here $w$ represents the band width $\omega_{c2} - \omega_{c1}$ and $\omega_m$ the arithmetic mean of the two cut-off frequencies $\omega_{c1}$ and $\omega_{c2}$ and may thus be considered to coincide with the mid-band frequency. Equation 11 which is roughly plotted on Fig. 2B represents an amplitude modulated carrier wave with a carrier frequency equal to that of mid-band. The maximum response occurs at $t = T_0$ and is proportional to $wK$ which is the area under the amplitude response characteristic and the length of the main oscillatory lobe is $$\frac{4}{w}$$

which is inversely proportional to the band width.

The operations which are described theoretically in the foregoing pages of the specification, namely, the recording and storing of the impressed input signal, taking samples of the stored record in a predetermined sequence, and weighting and collecting the samples in a common output, are performed in accordance with one embodiment of the invention by a circuit such as shown in Fig. 3A of the drawings including a cathode-ray tube in which the recording and sampling operations are controlled by a single focussed beam alternately switched to different positions. The beam moves over a mica target, on the back of which are positioned a plurality of transverse parallel metal bars, each of which is connected to a common output through a resistance of a preselected value. Horizontal and vertical deflection plates located in the tube control the motion of the beam progressively over the target in a configuration such as indicated in Fig. 5A of the drawings. During the recording operation, in which the beam traces a vertical line on the target, the potential of a barrier grid adjacent the target is signal varied producing a record of charge on the target; during the wiping operations in which the beam moves across the target in a direction obliquely related to and immediately preceding and following the vertical recording line, the potential of the barrier grid is maintained at a constant value to enable the recorded charge to be neutralized. During neutralization, increments of current flow from the transverse bars on the back of the target, through the connected weighting resistances, and into the common output circuit to produce an output current modified in accordance with the desired characteristic.

Referring to Fig. 3A in detail; the cathode-ray tube 301 contains a target mosaic 310 disposed near the large end thereof with its surface substantially normal to the electron beam 302. The source of this electron beam 302 is an electron gun assembly comprising cathode 303, intensity grid 304a, focussing anode 304b, and anode 306 which are constructed in a manner well known in the art to produce a pencil beam having a cross-sectional diameter at the point of focus of the order of 10 mils. For the purpose of the system described herein, it is desirable to have the beam intensity as high as is possible without producing a defocussing of the beam. In an embodiment of the system constructed, for example, the beam currents were of the order of 50 microamperes. Normal direct-current operating biases for these elements of the electron gun are respectively supplied by potential sources 305 and 307. By means of a complex system of sweep circuits which will be described in detail hereinafter, deflection plates 309 and 311 control the electron beam so that its point of impact on the mosaic 310 moves along a path as previously described. An additional electrode 301a for adjusting the electrostatic field in the neighborhood of the target 310 comprises a conductive coating of a material such as, for example, graphite, which is applied with a uniform thickness of a few mils to the inner surface of the bulb 301, extending from the place where the bulb flares to a position nearly adjacent the target 310. The aforesaid conductive coating constituting electrode 301a may be operated at ground potential, contact to ground being made through a conductor extending through an airtight seal in the bulb 301. Alternatively, optimum operation may be found with this electrode connected to a direct-current potential source to provide either positive or negative bias with respect to ground.

The target mosaic 310 comprises a thin sheet of insulator 313 such as mica, with a fine mesh grid 312 held a few thousandths of an inch in front of the mica surface. The barrier grid 310 is essentially a fine mesh screen stretched parallel to the flat face of the dielectric surface 313 and spaced a few thousandths of an inch in front of it. The arrangement is indicated in Fig. 3C of the drawings, which is a detailed cross-sectional showing of the mosaic 310 in which 310' is a metal ring tightly fitted around the periphery of the dielectric element 313 to hold the barrier grid 312 in place; 313' is a mica spacing washer inserted between grid 312 and the dielectric surface 313' and 314' is a retaining ring inserted on the other side of the dielectric surface 313 to hold it in place. The mesh should be of sufficient fineness that the electron beam cross-section covers a number of openings thereof.

Several types of mesh have been found suitable:

(1) Conventional woven wire mesh (nickel) with about 200 to 400 wires to the inch, such as indicated in Figs. 4A and 4B; or
(2) Mesh made electrolytically using photoengraving techniques, such as indicated in Figs. 4C to 4D.

It is necessary to have the grid tightly stretched across a ring for the assembly shown in Fig. 3A. One method of doing this is indicated in Figs. 4E, 4F and 4G. The mesh is first stretched across hoops 1 and 1' in much the same manner as cloth is stretched in embroidery hoops, as indicated in Fig. 4E. An edge of the mounting ring R is coated with a thin layer of brazing solder, as indicated in Fig. 4F. Then assemblies of Figs. 4E and 4F are laid together on a lavite block as indicated in Fig. 4G, and heat treated in a hydrogen furnace at a temperature just sufficient to braze the mesh and ring R together. After removal from the hydrogen oven the excess mesh on the outside of R is cut off and the mesh remains tightly stretched across R.

In order to obtain the grid tightly stretched across the ring R it is preferable to have the expansion coefficients of the various materials related as follows:

Expansion coefficients of 1 and 1' should be larger than mesh 2 so that as assembly c is heated to the brazing temperature, rings 1 and 1' expand more than mesh 2 and the mesh is thereby stretched.

Expansion coefficients of ring R should be less than mesh 2 so that when unit c reaches the brazing temperature, the ring R is brazed to the mesh, and as the oven cools the mesh contracts more than ring R thus stretching the mesh very tightly across the ring R.

A typical set of materials and their expansion coefficients is as follows:

Hoops 1—Monel (a copper-nickel alloy), exp. coef.=$15 \times 10^{-6}$
Mesh 2—Nickel, exp. coef.=$13.5 \times 10^{-6}$
Ring R—An alloy known as Kovar comprising 29 per cent nickel, 17 per cent cobalt, 0.3 per cent manganese, and the remainder iron, exp. coef.=$6 \times 10^{-6}$ In the preferred embodiment, grid 312 should have a low secondary emission, although the tube is operative without this feature.

Transverse parallel metal strips or bars 314a, 314b, 314c and 314d are affixed to the back of and in contact with the mica sheet 313. Fig. 3B shows the positions of the bars 314a, 314b, 314c and 314d on the mica sheet 313. Though only four such bars are shown in Figs. 3A and 3B to simplify the description of the system, a practical filter would generally require many more. Of the order of 50 to 100 of these bars might be required to simulate an actual "$g$-function." For example, in one embodiment constructed, the target comprised a mica sheet about 1.25 inches square, and 0.0011 inch thick, having 13 horizontal pick-up bars on the rear face thereof, each 0.079 inch wide, and spaced apart by 0.01 inch. The bars or strips were deposited on the face of the mica sheet by evaporating gold in vacuum prior to assembly of the target in the final tube.

The path of the electron beam spot over the target mosaic 310 describes a series of alternatively vertical and diagonal lines, as indicated diagrammatically in Fig. 5A wherein the vertical lines represent the motion of the beam during the signal recording operation, and the oblique lines represent motion of the beam during the wiping or neutralizing operation which precedes and follows recording. The X and Y sweep potentials which are applied to deflection plates 311 and 309 to secure this sweep pattern are respectively indicated in Figs. 5B and 5C, and result from operation of a combination of circuits the operation and structure of which will now be described in detail.

The Y-axis sweep voltage has a simple sawtooth wave shape. The X-axis voltage remains constant during one half cycle so that the spot moves up the mosaic 310 along a vertical line. During the other half cycle, the spot moves down the mosaic at a constant rate, but the X-axis voltage causes it to follow a diagonal to the right-hand edge of the mosaic 310, thence directly across to the left-hand edge in a minimum length of time, then on down a diagonal to the bottom edge of the mosaic to a point slightly to the right of the preceding vertical spot trace. From this point it again moves vertically, following the same sequence as just described. After this sequence has been repeated to the point where the vertical line is at the right-hand edge of the mosaic 310, the pattern starts over at the left-hand edge. This transition is accomplished by giving the X-axis sweep voltage the wave shape shown in the middle of Fig. 5B, where the horizontal sections of the wave have progressed to the top, and the cycle is again repeated, starting at the bottom of the pattern.

The cyclic repetition rates of the wave forms indicated in Figs. 5A and 5B are determined by certain constants which in the discussion hereinafter will be designated as follows:

$2f_0$—frame frequency;
$af_0$—scanning frequency, or lines per second; and
$a/2$—number of lines per frame.

In one embodiment constructed by the applicant, $a$ was given a value of 98, and $f_0$ a value of 102.04 cycles per second, making the scanning frequency equal to 10,000 lines per second.

The controlling frequency for both the X and Y sweep circuits is generated in a conventional sine wave oscillator 326, which is operated at the frequency $af_0$.

The output of the oscillator 326 divides, part being applied to phase shifter 327, and part to a frequency step-down unit 342. The phase shifter 327 is of the continuously variable electrostatic type such as shown on Fig. 56d, page 942 of F. E. Terman's Radio Engineers' Handbook, first edition. The output of phase shifter 327 is divided, part being impressed on the square wave generator 331, and the other part on amplifier 365. Square wave generator 331 which has a square wave output of frequency $af_0$, as indicated in Fig. 7E, may comprise a circuit such as shown on Fig. 76, page 970, of F. E. Terman's Radio Engineers' Handbook, first edition, which is designed to produce a symmetrical square wave when a sine wave of sufficient amplitude is applied to its input. The output of the square wave generator 331 is separated into three parts, one of which is impressed on the X-axis sweep voltage generator 339, and the second part of which is impressed on the amplifier 353, whose output drives the input gating circuit utilizing crystal diodes 358, in a manner which will be described hereinafter. A third part of the output of square wave generator 331 is passed through an integrating network comprising large condenser 338 and large resistance 336 to amplifier 335. With a square wave input to the integrating circuit comprising condenser 338 and resistance 336, the output wave shape is triangular, as shown on Fig. 5C. After amplification in amplifier 335, the aforesaid triangular wave is applied to vertical deflection plates 309.

Considering, now, particularly that portion of the output of oscillator 326 which is impressed on the frequency step-down unit 342, the oscillator frequency $af_0$ is stepped down by a ratio of $a$ to a frequency $f_0$. Preferably, the frequency step-down circuit 342 is of the multivibrator type employing three pairs of push-pull stages, such as described on pages 512, 513 and 514 of F. E. Terman's Radio Engineers' Handbook, first edition. The output of frequency step-down circuit 342 divides with one part being impressed on the square wave generator 350, which is substantially similar to square wave generator 331 previously described. The output of square wave generator 350 which has a frequency of $f_0$, is impressed on the X-axis sweep voltage generator 339.

The other part of the output of the frequency step-down circuit 342 goes to the frequency step-up circuit 346, where it is converted from frequency $f_0$ to $(a+1)f_0$. Frequency step-up circuit 346 may comprise, for example, two tandem-tuned stages, which were arranged in accordance with one embodiment constructed by the applicant so that the first stage selected the 9th harmonic of the square wave input, following which, this 9th harmonic was made to overload a vacuum tube stage, and the 11th harmonic of the resultant signal was selected by another tuned circuit in the output of the latter overload stage. This gave a combined frequency multiplication of $11 \times 9$ or 99 times, resulting in a frequency of $10,102.04+$ cycles per second in the embodiment constructed.

The output of frequency step-up circuit 346 is transmitted through phase shifter 347, which is of the same type as phase shifter 327. The output of phase shifter 347 is applied to the input of square wave generator 348, which is similar to square wave generators 331 and 350 in principle, producing a square wave output having a frequency $(a+1)f_0$ which is impressed on the X-axis sweep voltage generator 339.

It will be seen that X-axis sweep voltage generator 339 has as input signals, three square wave signals having respective frequencies of $af_0$, $(a+1)f_0$, and $f_0$. In the embodiment previously mentioned, these frequencies were 10,000, $10,102.04+$, and $102.04+$ cycles per second. The manner in which X-axis sweep wave generator 339 operates to produce the X-axis sweep voltage from these input signals will be explained in connection with Fig. 6 of the drawings. The input leads 634 are connected to the output terminals of square wave generator 331, and the $af_0$ frequency square wave, which is at a high amplitude, is transmitted through transformer 635 to the grid of vacuum tube 637 which is connected in series with a resistance 636. This large square wave signal on the grid of vacuum tube 637 alternately cuts it off, and permits it to conduct plate current. During the half cycle when the grid of tube 637 is being driven positive with respect to the cathode, plate current flows from direct-current potential source 639 through resistance 638 to positively charge condenser 601. During the alternate half cycles when tube 637 is cut off, no current flows to charge condenser 601.

The discharging of condenser 601 is accomplished under control of the other two square wave input signals as follows. The square wave output signal of square wave generator 348 is applied to terminals 644 to which are connected small condensers 610 and 611 leading to the grids of the conventional triode vacuum tubes 602 and 603, respectively. The grids of tubes 602 and 603 are connected through resistances 612 and 613 to a direct-current source of potential 614 which is negative with respect to ground. The time constants of condenser 610 with resistance 612, and of condenser 611 with resistance 613, are small so that the signals applied to the grids of tubes 602 and 603 resulting from the square wave input to terminals 644 take the form of a series of short pips, as illustrated in Figs. 7A and 7B.

The output of square wave generator 350 is connected to terminals 643, which in turn are connected to the cathodes of conventional vacuum tubes 602 and 603. Resistances 605 and 606 are connected from cathodes of tubes 602 and 603, respectively, to ground. Thus on one half cycle of the square wave input to terminals 643, the cathode of tube 602 may be driven several volts positive with respect to ground while the cathode of tube 603 is driven several volts negative. On the next half cycle, the polarities on the cathodes are reversed. Fig. 7C illustrates the wave form of the voltage applied to these cathodes.

The direct-current biases on the grids of the tubes 602 and 603, the amplitudes of the square wave signals applied to the cathodes, and the pips applied to the grids, are all so adjusted that plate current only flows in either of the tubes if a positive pip is applied to its grid while its cathode is driven to a negative potential with respect to ground by the square wave input to terminals 643. The plates of tubes 602 and 603 are respectively connected in parallel to the primary of transformer 608 and receive direct-current power from potential source 604.

If the inputs to the two grids of tubes 602 and 603 are as shown in Figs. 7A and 7B, and the cathodes are driven by a square wave as shown in Fig. 7C, the sum of the two plate currents will be a series of pips as shown on Fig. 7D. It will be observed that the pips come at regularly spaced intervals equal to $$\frac{1}{(a+1)f_0}$$

seconds except at the times when the square wave shown on 7C changes from a positive to a negative value, or vice versa. At that time, the period between output pips is one-half as long as during the remainder of the cycle.

The pips as shown on Fig. 7D operate through transformer 608 to trigger off a blocking oscillator comprising the conventional triode tube 615. The grid of tube 615 is biased negatively with respect to the cathode by direct-current potential source 616. The pips appearing at the secondary of transformer 608 cause the potential of the grid of tube 615 to rise from below cut-off to a less negative bias at which plate current starts to flow in tube 615. This plate current flowing through winding 622 of a three-winding transformer 617 induces a voltage in winding 618 of that transformer which is connected in series with the grid of tube 615. The induced voltage is in the direction to make the grid more positive and is of such magnitude that it makes the grid draw current by making it positive with respect to the cathode. This current flowing through a circuit comprising condenser 620 and resistance 619, charges condenser 620 in a direction such as to tend to make the grid negative. Thus oscillations are not continued, but after one half cycle, the grid assumes a very large negative potential until some of the charge on condenser 620 leaks off through resistance 619.

This complete cycle of operation of the blocking oscillator results in a very short pulse of current in the plate circuit of tube 615 for every pip of the signal as shown on Fig. 7D. This short surge of plate current also induces a short pulse of voltage in winding 623 of transformer 617, which in turn applies a short pulse of voltage to the grid of tube 624 to drive it from its normal quiescent bias at cut-off, up to a positive potential with respect to the cathode. The cathode of tube 624 is biased negatively with respect to ground by potential source 626, and the grid has a cut-off bias with respect to cathode supplied by potential source 627. The plate of tube 624 is connected to condenser 601 whereby flow of plate current in tube 624 discharges condenser 601. As previously mentioned, this plate current flow is controlled by very short voltage pulses applied to the grid so that condenser 601 is discharged very quickly.

The wave form of the input to terminals 634 is shown in Fig. 7E. If it is assumed that tube 637 is cut off when the voltage as shown in Fig. 7E is negative, and that charging current flows to condenser 601, through tube 637 when the voltage as shown in Fig. 7E is positive, and that condenser 601 is discharged quickly at each pip of the wave form shown in Fig. 7D, the resultant wave shape across condenser 601 will be as shown in Fig. 7F. The horizontal stair steps in the wave form of Fig. 7F correspond to the intervals when tube 637 is cut off. The diagonal parts correspond to the charging of condenser 601, and the vertical parts correspond to the practically instantaneous discharging of condenser 601 through the plate circuit of tube 624.

The illustrations of Figs. 7A to 7F show wave shapes corresponding to the condition when $a$ is 10, which is a comparatively low value. In this case, there are only five stair steps in the fundamental period of the wave shape of Fig. 7F. In the embodiment of the previously-mentioned circuit which was constructed, the value of $a$ was 98 and the wave shape corresponding to Fig. 7F had 49 stair steps per fundamental period. In general, $a$ would preferably be a larger number than 10.

The preceding description has outlined one method of obtaining the desired wave shape for the X-axis sweep voltage. There are other methods, one of which utilizes the circuit illustrated in Fig. 8. When this circuit is used as the X-axis sweep voltage generator 339 of Fig. 3A, two modifications of the circuit of Fig. 3A are required. The frequency step-up unit 346 must multiply the frequency $f_0$ by a factor $2(a+1)$ instead of by the factor $(a+1)$, and the $f_0$ square wave input to the X-axis sweep voltage generator 339 from square wave generator 350 is not needed, so that square wave generator 350 may be omitted.

Referring again to Fig. 8, input terminals 834 are connected to the output of square wave generator 331 of Fig. 3A, and input terminals 844 are connected to the output of square wave generator 348 of Fig. 3A. Transformer 835, resistances 836 and 838, tube 837, condenser 801 and potential source 839 perform identical functions to those of transformer 635, resistances 636 and 638, tube 637, condenser 601 and potential source 639, respectively of Fig. 6. By means of these circuit elements, condenser 801 is allowed to charge periodically under control of the input at terminals 834, the wave shape of which is illustrated on Fig. 9B.

The discharging of condenser 801 is performed by tube 824 under control of blocking oscillator tube 815 in the same manner as condenser 601 of Fig. 6 was discharged by tube 624 under control of blocking oscillator tube 615. The associated circuit elements namely, transformer 817, potential sources 816, 826 and 827, resistances 819 and 828, and condenser 820 perform functions identical to those explained in connection with transformer 617, potential sources 616, 626 and 627, resistances 619 and 628, and condenser 620 of Fig. 6.

Figure 9A:
Figure 9B:
Figure 9C:
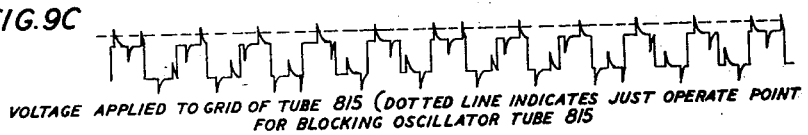

The input signal to the grid of the blocking oscillator differs from the case described with reference to Fig. 6 and is shown in Fig. 9C. This input signal is the sum of the voltages supplied through transformer 808, and the voltage appearing across resistance 812. Condenser 811 is a small condenser, and resistance 812 is relatively small, so that with a square wave applied to input terminals 844, short pips will be obtained across resistance 812 because of the differentiating action of condenser 811 and resistance 812. The voltage appearing across resistor 812 is shown in Fig. 9A. This wave shape, when combined with a voltage having the wave shape of Fig. 9B, gives the resultant voltage of Fig. 9C to be applied to the grid of tube 815. The normal negative bias on the grid of tube 815 which is supplied by direct-current potential source 816, prevents any flow of plate current in tube 815 except during the very short intervals of the signal shown on Fig. 9C when the positive pips are superimposed on the positive halves of the square wave signal. When this flow of plate current is initiated in tube 815, the very short voltage pulse is applied to the grid of tube 824 to make its plate circuit discharge condenser 801 in the same manner as described in connection with Fig. 6.

Figure 9D:
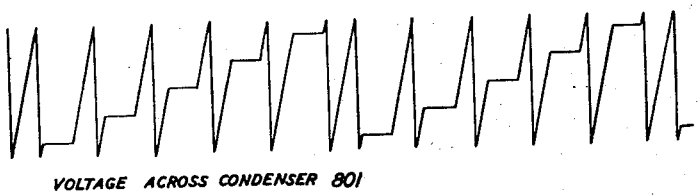

The timing of these discharge pulses is seen to be the same as that obtained with the circuit of Fig. 6, and in combination with the charging function controlled by square wave input to the tube 837, results in a wave shape across condenser 801 such as is shown in Fig. 9D. This is the desired wave shape for the X-axis sweep voltage.

It has been shown how the sweep voltage generator 339 of Fig. 3A may be constructed in two different ways. The output wave shape in either case is the same, and is applied to the input of amplifier 341. The output of amplifier 341 is connected to the horizontal deflection plates 311 of the storage tube 301.

The voltages applied to deflection plates 309 and 311, having wave shapes like those of Figs. 5C and 5B, respectively, cause the electron beam to move in a path as indicated in Fig. 5A.

The manner in which the motion of the beam on the target mosaic 310 is synchronized with the signal recording and wiping operations will be understood from the following discussion.

Referring again to Fig. 3A, signal input to the system is applied through leads 356 to a gating circuit, comprising series resistance 357 and crystal diodes 358, on which is impressed a square wave signal having a frequency $af_0$ applied through transformer 354. Diodes 358 are rectifying devices, such as the well-known germanium or silicon crystal rectifiers widely used in microwave detectors. During the first half of the square wave voltage cycle when the voltage applied through transformer 354 to diodes 358 is in the direction of easy current flow, the alternating-current impedance of the diodes 358 is low so that the signal tending to appear on the grid of vacuum tube 360 is shunted to ground through the aforesaid low impedance of the crystal diodes 358 and the secondary of transformer 354. On the other half cycle of the square wave applied voltage, the crystal diodes 358 have a high impedance, and the incoming signal is not appreciably shunted to ground. The frequency of the square wave voltage is at least twice as great as the highest input signal frequency, so that the signal which is applied to the grid of vacuum tube 360 consists of alternate sections of the input signal wave form, interspersed with sections of zero signal voltage. Vacuum tube 360 is supplied with plate potential from potential source 316, and a resistor 362 is connected between its cathode and ground, making it a cathode follower stage. A replica of the signal applied to the grid of tube 360 is obtained across resistance 362, and impressed on the storage tube mosaic grid 312.

As described in the preceding paragraph, the operation of the input gate using crystal diodes 358, is synchronized with the sweep of the beam by the $af_0$ square wave impulse so that the input signal to leads 356 is shunted to ground during the intervals when the beam is proceeding along a diagonal path over the target mosaic 310, and the input signal is not shunted but appears on the mosaic grid 312 during that part of the cycle when the beam is moved along a vertical path. During the interval when the beam is moved along the vertical path, the mica surface adjacent to the mosaic grid 312 on which the beam impinges, is charged at each point to a potential corresponding to the instantaneous value of the input signal voltage on the mosaic grid 312 at that time.

The charging and discharging of the target takes place through a mechanism involving a transfer of secondary electrons between the mica element 313 and the grid 312. During those periods when the potential of the grid is positive with respect to the spot on the mica impinged by the beam, secondary electrons, in excess of unity ratio, will move from the mica to the grid, leaving a positive charge on the spot with respect to adjacent spots. If, however, the grid is negative with respect to the mica spot impinged by the beam, the secondary electrons will be repelled from the grid, causing the mica spot to become more negative. Thus, it is apparent that during the recording operation, while grid 312 is potential varied under control of impressed signal voltages, the mica element 313 will store a charge record which varies from point to point as the intensity of the signal.

During the succeeding wiping period in which the beam moves over the target diagonally, the mosaic grid 312 is held at constant or reference potential, and the mica surface of target 310 traversed by the beam spot is discharged point by point to this reference potential, whereby the recorded charge is neutralized leaving the mica element 313 at a constant potential for a repetition of the recording operation. During this discharging of the front surface of the mica, capacitive currents are caused to flow in the bars on the back surface of the mica plate. Thus, if the potential of a small area on the front surface of the mica is caused to change by a few volts, a bar directly behind this small area will have its potential correspondingly changed in an amount depending on the capacity between the small area on the front and the bar on the rear of the mica.

The bars 314a, 314b, 314c and 314d are connected to the grids of tubes 318a, 318b, 318c and 318d, respectively, of which only tubes 318a and 318d are shown on Fig. 3A. In addition, each bar is also connected to a clamping circuit which is arranged to shunt the bar to ground through a low impedance during the period when the signal is being laid down on the mica, i. e., when the electron beam is moving along a vertical path. The clamping circuit for bar 314a comprises two crystal diodes 315a in series, with their mid-point connected to the bar, and their outer ends connected to a source of square wave signals, namely, the secondary of transformer 317. The center tap of the secondary of transformer 317 is connected to ground. The operation of this clamping circuit is thus similar to that of the input gate circuit including crystal diodes 358 and transformer 354, described previously. The other crystal diodes 315b, 315c and 315d are arranged in a similar manner to clamp bars 314b, 314c and 314d. All of these crystal diodes receive their driving voltage through the one transformer 317, so that all bars are simultaneously either shunted to ground, or effectively unshunted depending on the polarity of the square wave drive voltage.

The source of square wave voltage for the bar clamp circuits comprising transformer 317 and crystal diodes 315a to 315d, inclusive, is square wave generator 370, similar in principle to the square wave generators 331, 348 and 350, whose output connects to transformer 317 by way of leads 373, and whose input is a sine wave of $a f_0$ frequency derived from the output of phase shifter 327 by way of leads 328 to amplifier 365. The output of amplifier 365 is split into three parts. One part passes through the network comprising condenser 371 and resistance 372 to the input of a square wave generator 370. The function of the circuit comprising condenser 371 and resistance 372 is to shift the phase of the $a f_0$ sine wave a small amount so as to make the bar clamp circuits operate from the shunting to the open condition a very short interval after the mosaic grid is switched from the signal value to the constant value of voltage, thereby avoiding a large transient surge of potential at the bars due to the sudden shift of potential on the mosaic grid 312, which has an appreciable capacity to the bars.

A second part of the output of amplifier 365 is impressed on a network comprising condenser 376 and resistance 377, and thence to the input of square wave generator 375, whose output drives the first output gate circuit in a manner to be described hereinafter. The condenser 376 and resistance 377 are adjusted to give a small phase shift so that the operation of the first output gate will be delayed in time slightly with respect to the operation of the bar clamp circuit which is driven by square wave generator 370.

The third part of the output of amplifier 365 is impressed on a network comprising condenser 388 and resistance 389, and thence passes to the input of square wave generator 387, whose output drives the second output gate in a manner to be described hereinafter. The condenser 388 and resistance 389 provide a small phase shift to delay the operation of the second output gate relative to operation of the first output gate.

In preceding paragraphs of the specification it has been shown how the signals are stored on the mica, and how they result in voltage changes on the bars when the bars are unclamped and the electron beam proceeds along a diagonal path over the mosaic. These small voltage changes on the bars control the grid bias of the conventional three-electrode tubes 318a to 318d, inclusive, whereby corresponding voltages are impressed on the weighting and summing network following tubes 318a to 318d in the circuit. The plate circuits of the aforesaid tubes 318a to 318d are energized by the potential source 319 through the respective resistances 398a to 398d, and resistances 320a to 320d are connected between cathodes and ground in cathode follower arrangement. Weighting resistances 322a to 322d, inclusive, may be connected either to the plates or cathodes of tubes 318a to 318d with one resistance connected to each tube. If, for example, a weighting resistance 322 is connected to a cathode of a tube 318, alternating-current potential variations on the grid will be transmitt[ed] without phase shift. However, if resistance 3[22] is connected to the plate a phase reversal resul[ts]. Both ways of connecting the weighting resistan[ce] 322 are desirable if the "g-function" contai[ns] both positive and negative values. In the ca[se] of Fig. 3A, resistance 322a is shown connected [to] the plate of tube 318a; and resistance 322d [is] shown connected to the cathode of tube 318d. ] [In] general, the values of resistances 322a, 322b, 32[2c] and 322d will not be alike, but will vary in a[c-] cordance with the shape of the g-function in [a] manner to be described later.

All of the weighting resistances 322 are co[n-] nected in parallel to one terminal of the rel[a-] tively small resistance 323, the other end of whi[ch] is connected to ground. Thus, the voltage mea[s-] ured across resistance 323 is proportional to t[he] sum of all the currents flowing in the weightin[g] resistances 322a to 322d, inclusive.

It is thus seen that the wave shape of the vol[t-] age appearing across resistance 323 consists [of] periods of constant voltage corresponding to t[he] interval during which the bars are all shunte[d] to ground alternated with periods in which t[he] signals are being collected from the bars an[d] added in turn as the electron beam sweeps ov[er] the target mosaic 310. During the intervals i[n] which the signals are being collected, the vol[t-] age across resistance 323 is changing as succe[s-] sive bar signals are added, the final value of vol[t-] age across resistance 323 after all the bars hav[e] been crossed by the diagonal path of the bea[m] and just before the bars are clamped or shunte[d] to ground, corresponding to the desired sign[al] output. It is at this instant that it is desirab[le] to gate the voltage through the first output gat[e] to condenser 383, holding the voltage on con[-] denser 383 constant at this value, until the ne[xt] succeeding cycle of signal collection from th[e] bars.

The gating of the signal voltage from resistanc[e] 323 to the succeeding circuit components is pe[r-] formed by crystal diodes 380 which are driven b[y] a square wave signal at the frequency $a f_0$ ob[-] tained through transformer 379 from the outp[ut] of square wave generator 375. Resistance 323 [is] connected to the center tap of the secondary [of] transformer 379. When the polarity of the squa[re] wave voltage is such as to cause current to flo[w] in the forward direction through crystal diod[es] 380, their impedance is thereby made relativel[y] low. Condenser 383 is connected to a point be[-] tween crystal diodes 380, and is charged or di[s-] charged as the case may be, to the potential [of] lead 324 from resistance 323, through the sec[-] ondary of transformer 379 and the low impedanc[e] of the diodes.

The phasing of the square wave output [of] square wave generator 375 is arranged so tha[t] the driving voltage on crystal diodes 380 revers[es] phase at the time when all of the bar signa[ls] have been collected, and just before the ba[r] clamp circuit shunts the bars 314a to 314d t[o] ground potential. With this reversal of polarit[y] the crystal diodes 380 are no longer low im[-] pedances, but become very high impedances s[o] that in effect, condenser 383 is disconnected fro[m] resistance 323, and any changes in potenti[al] across resistance 323 then do not influence th[e] charge on condenser 383. Thus it will be see[n] that during the major part of the interval whil[e] signals are being collected from the bars 314a t[o] 314d, inclusive, condenser 383 is connected to re[-] sistance 323 through the first output gate, an[d]

that during this interval, the potential on condenser 383 is changing as successive bar signals are added. When all bar signals have been collected and condenser 383 has on it a charge corresponding to their weighted sum, the first output gate opens until the next interval during which signals are to be collected from the bars.

The signal voltage appearing across condenser 383 is applied to the grid of tube 381, the plate of which is energized by potential source 382. A resistance 385 is connected between the cathode of tube 381 and ground, and the output signal is taken across this resistance, thus constituting a cathode follower arrangement of tube 381. The signal voltage appearing across resistance 385 is essentially the same in wave form as that appearing across condenser 383. In order to remove the variations in this wave form corresponding to the collection of signals from bars 314a to 314d, inclusive, a second output gate is arranged to close a conducting path between resistance 385 and condenser 399 during the interval when the first output gate is open. The charge on condenser 383 is thus quiescent at a value corresponding to the desired signal value.

The second output gate referred to above uses crystal diodes 392 and transformer 390, a square wave driving voltage being obtained from square wave generator 387, which alternately makes the impedance of diodes 392 low and then high, depending on polarity of driving voltage. Resistance 385 is connected to the center tap of transformer 390, and condenser 399 is connected to the point between crystal diodes 392. With the exception of the shift in timing of the two square wave driving voltages, operation of the second output gate is substantially the same as that of the first output gate, the second output gate being timed to make crystal diodes 392 low impedance during the interval when crystal diodes 380 are high impedance, and vice versa.

The signal appearing on condenser 399 is applied to the grid of tube 393, the plate circuit of which is energized by potential source 394. Thus, the final output signal is taken across resistance 396 which is connected between the cathode of tube 393 and ground.

In order to more clearly indicate the manner in which the system of Fig. 3A of the drawings functions in accordance with the theory discussed in the early part of the specification, to modify an impressed signal in accordance with a pre-selected characteristic, simplified diagrams of the recording and wiping operations of the electron beam 302 on the target 310 are shown in Figs. 11A, 11B, and 11C. These will now be described.

Assume that the network response to be simulated by the system of Fig. 3A has a "$g$-function" or impulse response characteristic of the form indicated in Fig. 10 of the drawings. This may be approximated by a series of values represented by $g_0$, $g_1$, $g_2$ and $g_3$, which are seen to be ordinates of the $g$-function curve selected at equal intervals $\Delta \tau$ from time $t=t_0$ to time $t=n\Delta \tau$, which represents substantially the complete period of duration of the $g$-function. In order to simplify the present illustration, the selected $g$-function will be represented by only four ordinates, although it is apparent from the discussion in the early part of the specification that many more ordinates may be required to give a workable approximation of the chosen function. Hence, the target 310, as described with reference to Fig. 3A, is equipped with four transverse backing elements, which are connected through individual amplifier tubes and the respective resistance elements 322a—322d to a common output circuit. For simplicity of illustration, the amplifier tubes, bar clamps, and output gate circuits, have been omitted from Figs. 11A, 11B and 11C and the weighting resistance elements 322a—322d shown as connected directly to the respective target elements 314a—314d. Each of the weighting resistors is given a value which corresponds to an ordinate of the $g$-function indicated in Fig. 10, so that element 322a is assigned a value proportional to the ordinate $g_3=g(3\Delta\tau)$, element 322b, a value proportion to $g_2=g(2\Delta\tau)$, etc.

The beam moves over the target 310 to perform the recording and wiping operations in a manner shown and described with reference to Fig. 5 hereinbefore. Referring to Fig. 11A, let us assume, for the present, that the scanning beam performs only the recording operation by moving up the target in a series of parallel vertical lines, which for the purposes of simplifying the explanation, have been reduced to four. The period for completion of the scanning operation from left to right across the target is determined by the period of duration of the $g$-function, which in this case is equal to $3\Delta\tau$.

The order in which the beam in wiping position neutralizes the charges deposited on the target 310 will now be described with reference to Fig. 11C, which shows a simplified diagram of the operation. It will be assumed that the beam has just completed one scan of the target from left to right, in which the recorded columns of charge are proportioned as indicated in Fig. 11A, and is about to begin a second scan of the target, during which interval the columns of charge recorded will be proportioned as indicated in Fig. 11B.

Prior to the recording of the vertical column I, the beam traces an oblique wiping line AA', flies back from right to left across the line A'B, and traces the oblique line BB', which positions the beam to commence the recording of vertical column I. It is apparent that the charges neutralized by the beam as it traces the wiping scanning line AA', are charges which were recorded on the target during the previous interval of scan, and which have values such as indicated in Fig. 11A. The position of the wiping line AA', which is directed diagonally from the upper left-hand corner to the lower right-hand corner of the target 310, is determined by the points of intersection of each of the target elements 314(a–d) taken in succession from top to bottom with one of the recording scanning lines I–IV, taken in succession from left to right. Thus as the beam traces the line AA', neutralizing recorded charges on the mica face 313 of the target 310, the following proportionate charges are released from the transverse backing elements 314:

314a: $E(t_0-3\Delta\tau)\Delta\tau$
314b: $E(t_0-2\Delta\tau)\Delta\tau$
314c: $E(t_0-\Delta\tau)\Delta\tau$
314d: $E(t_0)\Delta\tau$ For the purposes of this discussion, the horizontal fly-back of the beam from A' to B will be neglected. Because of its position, no charge is released during the oblique scan BB'.

After the beam has executed the vertical scanning line I, whereon the recorded charge assumes the values indicated in column I of Fig. 11B, the beam traces an oblique wiping line CC', which is parallel to the wiping line AA', and determined by the points of intersection between the top three target element 314a, 314b and 314c and their respective points of intersection with the recording line II, III and IV, taken in succession.

Referring still to Fig. 11A, assume that the beam reaches the right-hand recording position on the target designated as column IV at a reference time $t=t_0$, then column I on the left-hand side of the target must have been recorded at time $t=(t_0-3\Delta\tau)$, column II at $t=(t_0-2\Delta\tau)$, and column III at $t=(t_0-\Delta\tau)$. Assuming that the time required to scan from the bottom to the top of the target is negligible, columns of charge are laid down which are proportional to the following values:

Column I    $\Delta q_1 = E(t_0-3\Delta\tau)\Delta\tau$
Column II    $\Delta q_2 = E(t_0-2\Delta\tau)\Delta\tau$
Column III    $\Delta q_3 = E(t_0-\Delta\tau)\Delta\tau$
Column IV    $\Delta q_4 = E(t_0)\Delta\tau$ Assume now, that the charge has been completely wiped from the target, and that the scanning beam is again returned to the left-hand side of the target to repeat the recording operation. The new columns of charge laid down on the target will be proportional to the following values, as shown in Fig. 11B of the drawings.

Column I    $\Delta q_5 = E(t_0+\Delta\tau)\Delta\tau$
Column II    $\Delta q_6 = E(t_0+2\Delta\tau)\Delta\tau$
Column III    $\Delta q_7 = E(t_0+3\Delta\tau)\Delta\tau$
Column IV    $\Delta q_8 = E(t_0+4\Delta\tau)\Delta\tau$ The foregoing description with reference to Figs. 11A and 11B has been concerned only with the recording operation of the beam. As described hereinbefore with reference to Fig. 4, after each successive vertical scanning line, the beam is deflected to scan the target in a corresponding pair of obliquely directed lines for the purpose of releasing the increments of charge on the transverse backing elements to flow into a common output in a predetermined order. As the beam in wiping position neutralizes an increment of charge on a given one of the elements 314, current proportional thereto flows through the corresponding one of the weighting resistance elements 322, and is further proportioned in accordance with a given ordinate of the selected g-function. The following charges are released from the transverse backing elements by this operation:

314a: $E(t_0-2\Delta\tau)\Delta\tau$
314b: $E(t_0-\Delta\tau)\Delta\tau$
314c: $E(t_0)\Delta\tau$ After the beam has executed a return scan from point C' to point D, another wiping line DD' is traced. It is apparent that the charges released during the wiping operation DD' are the newly recorded charges that have been laid down by the beam during the present interval of scan, and which assume the values indicated in Fig. 11B. Therefore, the charge released by the scan DD' is from a single transverse target element, and assumes the following value:

314d: $E(t_0+\Delta\tau)\Delta\tau$

In a similar fashion, after the recording of column II, the wiping beam traces the oblique line EE', releasing increments of charge:

314a: $E(t_0-\Delta\tau)\Delta\tau$
314b: $E(t_0)\Delta\tau$ and the line FF', releasing increments of charge:

314c: $E(t_0+\Delta\tau)\Delta\tau$
314d: $E(t_0+2\Delta\tau)\Delta\tau$

After the recording of column III, the wiping beam traces the line GG', releasing increments of charge:

314a: $E(t_0)\Delta\tau$ and the line HH', releasing increments of charge:

314b: $E(t_0+\Delta\tau)\Delta\tau$
314c: $E(t_0+2\Delta\tau)\Delta\tau$
314d: $E(t_0+3\Delta\tau)\Delta\tau$ No charge is released by the scan I—I' across the upper right-hand corner of the target, after which the beam is returned to the left-hand side of the target to begin another complete scanning interval.

As the increments of charge are released by the wiping beam, they flow into the output circuit through the weighting resistors attached to the respective transverse target elements. The following chart shows the order in which the weighted increments of charge flow into the output circuit:

line $AA' = g(3\Delta\tau)E(t_0-3\Delta\tau)\Delta\tau + g(2\Delta\tau)E(t_0-2\Delta\tau)\Delta\tau + g(\Delta\tau)E(t_0-\Delta\tau)\Delta\tau + g(0)E(t_0)\Delta\tau$ $\begin{cases} \text{line } CC' \\ \text{line } DD' \end{cases} = \begin{array}{l} g(3\Delta\tau)E(t_0-2\Delta\tau)\Delta\tau + g(2\Delta\tau)E(t_0\Delta\tau)\Delta\tau + \\ g(\Delta\tau)E(t_0)\Delta\tau \\ +g(0)E(t_0+\Delta\tau)\Delta\tau \end{array}$ $\begin{cases} \text{line } EE' \\ \text{line } FF' \end{cases} = \begin{array}{l} g(3\Delta\tau)E(t_0-\Delta\tau)\Delta\tau + g(2\Delta\tau)E(t_0)\Delta\tau \\ +g(\Delta\tau)E(t_0+\Delta\tau)\Delta\tau + g(0)E(t_0+2\Delta\tau)\Delta\tau \end{array}$ $\begin{cases} \text{line } GG' \\ \text{line } HH' \end{cases} = \begin{array}{l} g(3\Delta\tau)E(t_0)\Delta\tau \\ +g(2\Delta\tau)E(t_0+\Delta\tau)\Delta\tau + g(\Delta\tau)E(t_0+2\Delta\tau)\Delta\tau \\ +g(0)E(t_0+3\Delta\tau)\Delta\tau \end{array}$ Referring to Equation 2' derived in the early part of the specification, it is seen that the summation of the charges released during the scan of the beam along line AA' is an approximation of the response integral for time $t=t_0$, and may be generalized by the following equation:

$$Q(t_0) = \sum_{\tau=0}^{\tau=n} E(t-\tau)g(\tau)(\Delta\tau)$$

where $Q(t_0)$ represents the total charge collected at time $t=t_0$, and $\tau$ varies by integral values of $n$ from 0 to $(n\Delta\tau)$, where $n\Delta\tau$ is the period required to completely represent the chosen g-function.

Assuming for the purposes of approximation, that the wiping operations along lines CC' and DD' occur at the same time, a period later by the interval $\Delta\tau$ than the wiping operation along the line AA', it will readily be seen that the summation of the charges released during these two scanning periods gives an approximation of the response integral for time $t=(t_0+\Delta\tau)$ which may be generalized as follows $$Q(t_0+\Delta\tau) = \sum_{\tau=0}^{\tau=n} E(t-\tau+\Delta\tau)g(\tau)\Delta\tau$$

In a similar manner, it can be shown the sum of the charges released along the scanning lines EE' and FF' approximates the response integral for time $t=(t_0+2\Delta\tau)$, and the sum of the charges released along the scanning lines GG' and HH' approximates the response integral for time $t=(t_0+3\Delta\tau)$. Thus, it can be seen from the foregoing simplified explanation, that the output of the system of Fig. 3A progressively approximates the response integral at each of a succession of equally spaced points in time, the proximity of which depends on the physical limitations of the apparatus.

It will be understood that the system of the present invention is not limited to the use of any element or combination of elements disclosed by way of illustration in this specification and the attached drawings; and that the principles of the present invention are capable of embodiment in other forms than those specifically disclosed.

What is claimed is:

1. The method which comprises progressively producing a series of linear coextensive parallel records in space which vary from one to another in accordance with the instantaneous values of a given signal after each of a succession of equal time intervals, during each said interval neutralizing points on a given number of adjacent records of said series in rotation to produce a succession of samples proportional to each of said records, said points disposed along a line obliquely directed with respect to said records, weighting each of said samples in rotation in accordance with selected values of a chosen weighting function, integrating the weighted samples in a common output circuit, and repeating said neutralizing, weighting, and integrating steps during each succeeding interval commencing with the record next adjacent to the record with which the previous operation commenced.

2. The method which comprises under control of an electron beam progressively producing a series of linear coextensive parallel charge records on a target interposed in the path of said beam which vary from one to another in accordance with the instantaneous values of a given signal after each of a succession of equal time intervals, during each said interval under control of said beam neutralizing points on a given number of adjacent records of said series in rotation to produce a succession of currents from said target which are proportional to each of said records, said neutralized points disposed along a line obliquely directed with respect to said records, weighting each of said currents in accordance with a selected value of a chosen weighting function, integrating the weighted currents in a common output circuit, and repeating said neutralizing, weighting, and integrating steps during each succeeding interval commencing with the record next adjacent to the record with which the previous operation commenced.

3. The method in accordance with claim 2 in which the step of producing under control of an electron beam a series of linear coextensive charge records on said target comprises controlling secondary radiation from said target at the successive points impinged by said beam by varying the electrical field adjacent said target in accordance with variations in the intensity of the applied signal.

4. The method in accordance with claim 3 in which the step of, under control of an electron beam, neutralizing points on a given number of adjacent records of said series in rotation to produce a succession of currents from said target which are proportional to said records comprises controlling secondary radiation from said target at successive points impinged by said beam by maintaining the electrical field adjacent said target at a constant reference potential.

5. A system for simulating network response which comprises in combination a signal source, a source of a beam of electrons, a target interposed in the path of said beam, deflecting means comprising a circuit for causing said beam to periodically assume different scanning directions in alternate succession for concurrently scanning said target in two series of substantially parallel lines, said series having obliquely related directions in the plane of said target, recording means under control of said beam in one of said scanning directions to produce a record of charge on said target which varies from one to another of said lines in accordance with the amplitude-time variation in said signal, charge-storing means included on said target for storing increments of said record of charge on successive portions of said target, neutralizing means under control of said beam in another of said scanning directions to release increments of charge from certain portions of said target representing different instantaneous signal values during a selected past interval of said signal, means including a plurality of circuits individually connected to said charge-storing means for weighting each of the increments of charge from successive portions of said target in accordance with a different selected value of a weighting function, a common output circuit connected to collect and integrate the increments of charge from said charge-storing means through said weighting circuits to produce a modified output signal, and means comprising a synchronizing circuit connected to said recording means, said neutralizing means, and said output circuit to initiate periodic repetition of a cycle including said recording, neutralizing, weighting, collecting and integrating operations.

6. A transducer comprising in combination a signal source, a source of a beam of electrons, a target interposed in the path of said beam, and a deflecting circuit for causing said beam to assume in periodic succession a first, a second, and a third scanning direction for scanning said target in three series of scanning lines individually laid down in alternate succession, the first said series comprising a progression of substantially straight parallel lines positioned at spaced intervals across the surface of said target, the second said series comprising a progression of substantially straight parallel lines obliquely directed with respect to the lines of said first group in the plane of said target, each line of said second group progressively positioned to immediately precede a corresponding line of said first group, and the third said series comprising a progression of substantially straight parallel lines obliquely directed in the plane of said target with respect to the lines of said first group and parallel to the lines of said second group, each line of said third group progressively positioned to immediately succeed a corresponding line of said first group, means under control of said beam in said first scanning direction to produce a record of charge on said target which varies in accordance with the time variations of said signal, charge-storing means for storing increments of said record of charge on successive portions of said target, neutralizing means under control of said beam in said second and third scanning positions to release increments of charge from a series of positions on said target representing different instantaneous signal values during a selected past interval of said signal, means including a plurality of circuits individually connected to said charge-storing means for weighting the increments of charge from each of said positions in accordance with a different selected value of a weighting function, a common output circuit connected to collect and integrate the increments of charge from said charge-storing means through said weighting circuits to produce a modified output, and means comprising a synchronizing circuit connected to said recording means, said neutralizing means, and said output circuit to initiate periodic repetition of a cycle including said recording, neutralizing, weighting, collecting and integrating operations.

7. A frequency selective system comprising in combination an electrical signal source, a cathode-ray tube having means for producing a beam of electrons, a composite target interposed in the path of said beam, said target comprising a plurality of elements including charge-storing means, said tube having deflecting means for moving said beam to repeatedly scan the elements of said target, means under control of said beam to produce a record of charge which varies from point to point on said target in accordance with the instantaneous values of amplitude of said signal, said charge-storing means varying from one to another of said target elements for modifying the increments of output current from successive target elements in accordance with selected values of a weighting function, an output circuit, and means under control of said beam to discharge into said output circuit the weighted increments of charge from said target elements in a preselected order whereby to produce a modified output current.

8. A system for simulating network response which comprises in combination a cathode-ray tube having a source of a beam of electrons, a target interposed in the path of said beam, deflecting means for directing said beam to trace the components of a first series of parallel lines across said target in alternation with the components of a second series of parallel lines, the two said series of lines being obliquely related in the plane of said target, a grid adjacent to the surface of said target in the path of said beam, means recurrently operative in synchronism with said beam while said beam traces a component of one of said series to impress on said grid potential variations in accordance with the amplitude time variations of an impressed signal, whereby secondary radiation from said target under control of said beam produces a record of electrical charge thereon, means recurrently operative in synchronism with said beam while said beam traces a component of a second of said series to impress on said grid a constant reference potential whereby under control of said scanning beam increments of charge proportional to said record are simultaneously released from certain portions of said target, said increments representing different instantaneous values in the history of said signal, means for weighting each of said increments of charge in accordance with selected values of a predetermined function, and means comprising an output circuit connected to collect and integrate said increments of charge received from said target and said weighting means to produce a modified output.

9. A frequency selective system comprising in combination an electrical signal source, a cathode-ray tube having means for producing a beam of electrons, a target interposed in the path of said beam, said target comprising a plurality of charge-storing elements, said tube having deflecting means for moving said beam to repeatedly scan said target, means comprising a grid adjacent the inner surface of said target having its potential varied in accordance with the signal from said source, said grid operating under control of said beam to produce a record of charge which varies from point to point on said target in accordance with the instantaneous values of amplitude of said signal, means associated with said target for modifying the increments of output current from successive target elements in accordance with selected values of a weighting function, a common output circuit, and means for discharging into said output circuit the increments of charge from said target elements in a preselected order whereby to produce a modified output current.

10. A system for modifying an impressed electrical signal in accordance with a desired characteristic which comprises in combination an electrical signal source, a cathode-ray tube including a source of a beam of electrons, a target disposed in the path of said beam comprising a plurality of separate charge-storing elements disposed in transverse parallel array, beam deflecting means comprising a sweep circuit for controlling said beam to repeatedly scan said target in a configuration comprising a first and a second series of obliquely disposed parallel lines each cutting a plurality of said target elements said lines individually laid down in alternate succession, an electrical circuit including the source of said beam connected to said signal source for depositing a charge on said target elements which varies from line to line in said first series in accordance with the instantaneous variations in the amplitude of said signal, means operative under control of said beam to release the charge deposited on said target elements from line to line in said second series, a plurality of weighting circuits each presenting a different preselected value of attenuation respectively connected to said charge-storing target elements and an output circuit connected to said weighting circuits to receive the charge from said charge storing target elements.

11. A system for modifying an impressed electrical signal in accordance with a desired characteristic which comprises in combination an electrical signal source, a source of electrical synchronizing signals, a cathode-ray tube including a source of a beam of electrons, a target disposed in the path of said beam comprising a plurality of electrically insulated charge-storing elements disposed in transverse parallel array, a grid disposed adjacent to the surface of said target in the direction of said beam, a direct-current potential source, a first gating circuit controlled by said synchronizing source and alternately operative during a first period to connect said grid to receive energy from said signal source, and during a second period to connect said grid to said direct-current source, beam deflecting means comprising a sweep circuit connected to said synchronizing source for controlling said beam to repeatedly scan said target depositing charge in a configuration comprising two series of obliquely disposed parallel lines each cutting a plurality of said target elements, said lines individually laid down in alternate succession during said first period and said second period, a plurality of weighing circuits each presenting a different preselected value of attenuation respectively connected to said charge-storing target elements, an output circuit, and means comprising a second gating circuit controlled by said synchronizing source which operates alternately during said first and second periods to control the connection of said output circuit to receive energy from said charge-storing target elements through said weighting circuits.

12. A system in accordance with claim 11 in which said charge-storing target elements comprise a plurality of separated conducting surfaces disposed adjacent the surface of an insulating element, and means under control of said synchronizing source including a plurality of clamping circuits respectively connected to said conducting surfaces for maintaining said conducting surfaces at a constant potential during said first period and discharging said conducting surfaces into said output circuit during said second period.

13. A system in accordance with claim 11 in which said weighting circuits comprise a plurality of electron discharge devices individually connected to said charge-storing target elements, each of said electron discharge devices having two electrodes which are in opposite phase with respect to signal currents passing therethrough, and a plurality of resistance elements which vary in magnitude from one to another in accordance with selected absolute values of a given weighting function, each of said resistance elements being connected in energy transfer relation with one or the other of said electrodes in each respective electron discharge device in accordance with the sign of the corresponding value of the said weighting function.

14. A signal transducer comprising a signal input circuit, an energy ray device having an electric charge-storing target extending across the path of the energy ray, a signal output circuit connected in charge-energy receiving relation to different parts of said target, means for continually driving said energy ray across said target to store charges therein along successive different lines extending in a first direction across said target, means coupled to said signal input circuit to vary the amount of charge so stored from moment to moment in correlation with the variation from moment to moment in the amplitude of a signal applied to said input circuit, and means to release charge energy so stored to said signal output circuit comprising means for continually directing said energy ray to successive different lines extending in a different direction across said target.

HAROLD L. BARNEY.
LISS C. PETERSON.
RALPH K. POTTER.
RAYMOND W. SEARS.

REFERENCES CITED

The following references are of record in the file of this patent:

UNITED STATES PATENTS

| Number | Name | Date |
|---|---|---|
| 2,175,573 | Schroter | Oct. 10, 1939 |
| 2,237,655 | Compton | Apr. 8, 1941 |